United States Patent
Harris et al.

(10) Patent No.: US 12,403,813 B2
(45) Date of Patent: Sep. 2, 2025

(54) APPARATUS FOR PREVENTING CARGO MOVEMENT IN A VEHICLE

(71) Applicant: Toyota Motor Engineering & Manufacturing North America, Inc., Plano, TX (US)

(72) Inventors: Ryan C. Harris, Saline, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 772 days.

(21) Appl. No.: 17/685,963

(22) Filed: Mar. 3, 2022

(65) Prior Publication Data
US 2023/0278482 A1 Sep. 7, 2023

(51) Int. Cl.
*B60P 7/06* (2006.01)
*B60P 7/04* (2006.01)

(52) U.S. Cl.
CPC ............ *B60P 7/065* (2013.01); *B60P 7/04* (2013.01)

(58) Field of Classification Search
CPC ................. B60P 7/065; B60P 7/04
See application file for complete search history.

(56) References Cited

U.S. PATENT DOCUMENTS

| | | | |
|---|---|---|---|
| 2,907,580 A * | 10/1959 | Tietig | B60R 7/02 293/1 |
| 4,792,178 A * | 12/1988 | Kokx | B60J 7/068 296/100.18 |
| 6,537,003 B1 * | 3/2003 | Rostoker | B60P 7/065 410/125 |
| 7,131,805 B1 | 11/2006 | Morris | |
| 2002/0073629 A1 | 6/2002 | Finell | |

FOREIGN PATENT DOCUMENTS

| | | | |
|---|---|---|---|
| DE | 2720057 A * | 11/1978 | ............ B60P 7/065 |
| DE | 102006057116 A1 | 6/2007 | |
| DE | 202013006707 U1 | 10/2013 | |
| EP | 1523421 B1 | 4/2005 | |
| EP | 3106332 B1 | 12/2016 | |
| WO | WO-9601194 A1 * | 1/1996 | ............ B60P 7/065 |
| WO | WO-2020053876 A1 * | 3/2020 | ............ B60P 7/065 |

* cited by examiner

*Primary Examiner* — Amy R Weisberg
*Assistant Examiner* — Philip Charles Adams
(74) *Attorney, Agent, or Firm* — Christopher G. Darrow; Darrow Mustafa PC

(57) ABSTRACT

Apparatuses described herein relate to improving the prevention of cargo movement during vehicle travel. In one embodiment, an apparatus for securing cargo within a vehicle includes a bladder coupled to an underside of a cover that extends over a cargo area, where the bladder faces the cargo area. The apparatus includes a supply device coupled with the bladder via a connecting member to expand the bladder into contact with the cargo within the cargo area.

10 Claims, 4 Drawing Sheets

APPARATUS FOR PREVENTING CARGO MOVEMENT IN A VEHICLE

TECHNICAL FIELD

The subject matter described herein relates, in general, to preventing cargo movement within a vehicle, and, more particularly, to using an inflatable bladder that expands into contact with the cargo to prevent the cargo from moving.

BACKGROUND

When cargo is placed in a cargo space of a vehicle, such as a truck bed or trunk, the cargo is free to move and slide as the vehicle travels. When cargo is free to move as the vehicle travels, cargo can break or become damaged. To prevent cargo from sliding and breaking during travel, drivers take inconvenient actions including taking slow turns, travelling at slow speeds, or holding the cargo as they drive. Moreover, existing mechanisms for securing cargo are cumbersome and include strapping cargo into place, placing cargo in pockets or nets, and placing cargo in designated compartments while also not necessarily securing cargo that is too large or small to fit into designated spaces. Further, these existing mechanisms require users to install equipment such as straps, pockets, nets, and compartment spaces within a cargo space, and additionally, these mechanisms require users to manually manipulate the equipment to secure the cargo.

SUMMARY

Example apparatuses disclosed herein relate to improving the prevention of cargo movement during vehicle travel. As previously noted, when cargo is placed in a space, such as a truck bed or trunk, cargo is free to slide and move, which can lead to cargo damage. As a result, drivers change driving maneuvers to prevent unsecured cargo from moving and breaking, install equipment, such as straps, pockets, nets, and compartments in cargo spaces to prevent cargo from moving, and manipulate equipment present in the vehicle to minimize cargo movement.

Therefore, in one embodiment, a system is disclosed that improves the prevention of cargo movement in a vehicle by providing an apparatus for securing cargo as the vehicle travels. For example, in the context of a truck, a user may store the cargo in a truck bed, which is prone to cargo items sliding about. As such, in one configuration, the system includes a tonneau cover with a bladder coupled to the underside of the tonneau cover that extends over the truck bed. In one approach, the bladder is formed from a material that is resistant to puncture, such as rubber. This allows the bladder to come into direct contact with and to tightly secure cargo, including cargo with sharp edges and rigid shapes. A supply device, such as a compressor, fill valve, or pump is coupled with the bladder to expand the bladder into contact with the cargo within the cargo area by filling the bladder with water, pre-bottled condensed air, or compressed air, which prevents the cargo from moving. The system may be located in any area of the vehicle used to secure cargo, including a truck bed, a trunk space, and a seatback of the vehicle.

The supply device may expand the bladder in response to an electronic input from a human machine interface (HMI) or from a switch located on the supply device. In one embodiment, the supply device includes a pressure sensor that senses the pressure within the bladder. The supply device, informed by the pressure sensor, expands the bladder to a threshold pressure to secure the cargo. In one approach, the bladder does not expand uniformly above the cargo space in order to conform around the various cargo or lack thereof in the cargo space. The threshold pressure may depend on the dimensions and weight of the cargo. As such, if the only cargo in the cargo space is a box, the threshold pressure informs the supply device to expand the bladder to touch and secure the box. The bladder will expand to the threshold pressure, which results in the bladder hugging the cargo as tightly as possible without puncturing the bladder and without deforming the cargo.

The bladder remains expanded until, in one arrangement, a solenoid valve located on the supply device is actuated. When the solenoid valve actuates, the flow of air or water within the bladder reverses into the supply device, causing the bladder to compress.

The bladder may comprise distinct zones. For example, in one configuration, the cover may be a trifold tonneau cover. As such, the bladder is separated into zones, each zone correlating to one section of the trifold tonneau cover. Accordingly, a pressure sensor is present to detect the pressure in each zone. The supply device expands each zone of the bladder separately to a threshold pressure for each zone. The threshold pressure may depend on the dimensions and weight of the cargo beneath the zone. As such, if the cargo in the cargo area is beneath the first zone of the bladder but not the second and third zones of the bladder, only the first zone of the bladder will expand to securely hug the cargo. As previously discussed, the first zone of the bladder remains expanded until a solenoid valve on the supply device is actuated to reverse the flow of air or water then-present in the bladder back into the supply device.

In one embodiment, an apparatus for securing cargo within a vehicle is disclosed. The apparatus includes a bladder coupled to an underside of a cover that extends over a cargo area, where the bladder faces the cargo area. The apparatus includes a supply device coupled with the bladder via a connecting member to expand the bladder into contact with the cargo within the cargo area.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
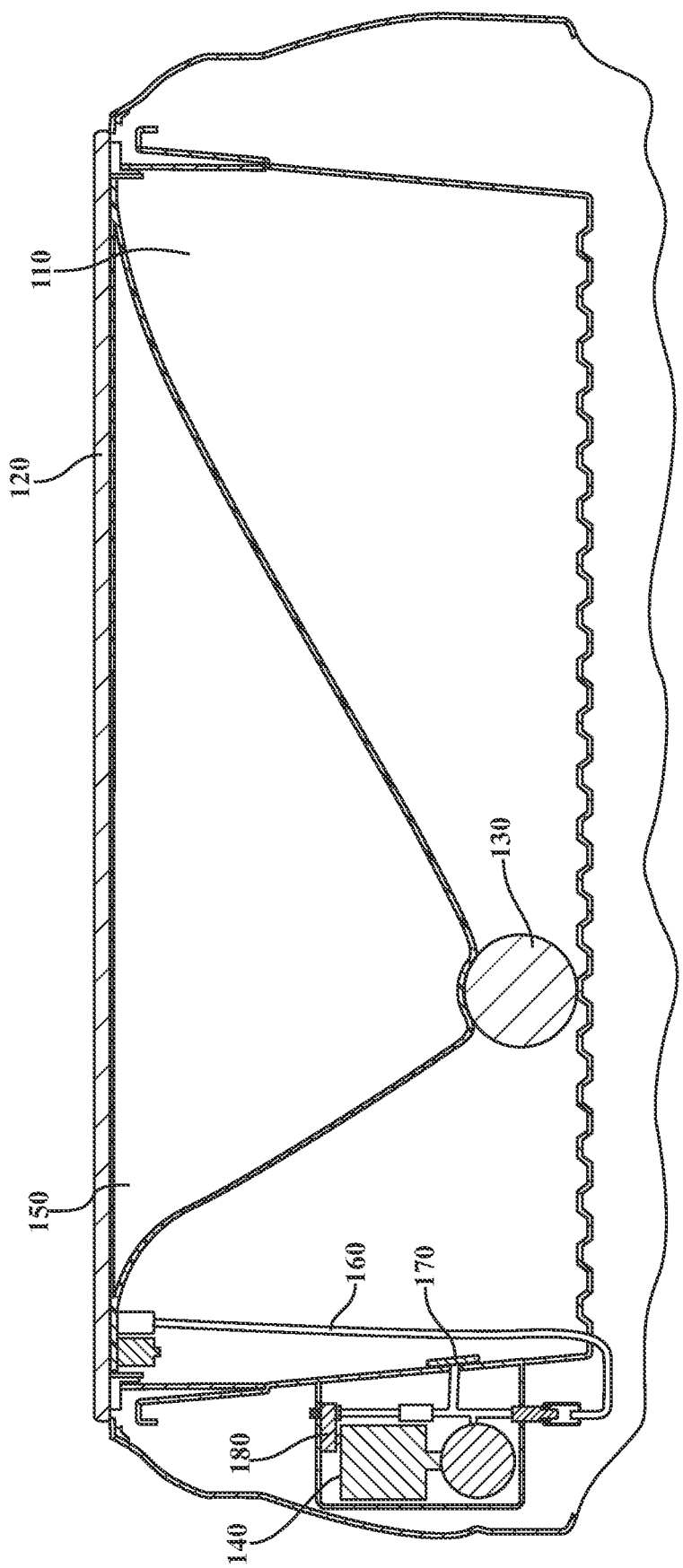
FIG. 1 illustrates one embodiment of an apparatus that is associated with improving the prevention of cargo movement in a cargo area.

Example apparatuses associated with improving the prevention of cargo movement are disclosed. Current methods for preventing cargo movement in a vehicle present difficulties for drivers. For example, when cargo is placed in a space, such as a truck bed or trunk, cargo is free to slide and move, which can lead to cargo damage. To prevent cargo damage, drivers must take actions, such as changing driving maneuvers to prevent unsecured cargo from moving and breaking, installing equipment, such as straps, pockets, nets, and compartments in cargo spaces to hold cargo tightly, and manipulating equipment present in the vehicle to minimize cargo movement (i.e., placing cargo in netting, strapping cargo down with restraints, installing compartments in a cargo area, etc.).

Therefore, in one embodiment, an apparatus is disclosed that improves the prevention of cargo movement in a vehicle by securing cargo as the vehicle travels. In one embodiment, the apparatus includes a cover that is positioned above cargo in a cargo space of the vehicle, where the cover includes an inflatable bladder coupled to the underside of the cover. For example, in the context of a truck, a user may store the cargo in a truck bed. Accordingly, in one configuration, the cover is a tonneau cover with a bladder coupled to the underside of the tonneau cover extending over the truck bed. A supply device, such as a compressor, fill valve, or pump is coupled with the bladder to expand the bladder into contact with the cargo within the cargo area by filling the bladder with water, pre-bottled condensed air, or compressed air. The location of the supply device may be in any area with extra space in the vehicle, such as an inner deck panel of a truck bed, an underside of a vehicle seat, a trunk space, or the like. In one approach, the bladder is formed from a material that is resistant to puncture, such as rubber. This allows the bladder to come into direct contact with and to tightly secure cargo, including cargo with sharp edges and rigid shapes, without rupturing. The system may be located in any area of the vehicle used to secure cargo, including a truck bed, a trunk space, a seatback of the vehicle, and the like.

The supply device may expand the bladder in response to an electronic input from a human machine interface (HMI) or from a switch located on the supply device. For example, the HMI may be a touchpad, such as a multimedia display within the vehicle, a button, or a switch located within the vehicle. In one approach, a driver interacts with the HMI to cause the supply device to expand the bladder. For example, a driver may touch a virtual button on the multimedia display to begin the flow of air or water coming from the supply device. In another configuration, a driver may activate the supply device manually by flipping a switch on the supply device.

In one embodiment, the supply device includes a pressure sensor that senses the pressure within the bladder. The supply device, informed by the pressure sensor, expands the bladder to a threshold pressure to secure the cargo. In one approach, the bladder expands above the cargo space in a non-uniform manner by conforming around the various cargo or within open space in the cargo area. In one configuration, the threshold pressure is manually input by a user on an HMI or directly on the supply device. In one embodiment, the user selects the threshold pressure from a list of preset threshold pressures.

The threshold pressure may depend on the dimensions and weight of the cargo. In one arrangement, a user may input information on the supply device to establish an appropriate threshold pressure for expanding the bladder. In one approach, a user may input information on an HMI about the cargo, such as the dimensions and weight of the cargo. In one embodiment, the threshold pressure increases as the dimensions of the cargo decreases, and the threshold pressure increases as the weight of the cargo increases. In one arrangement, a user may input the exact dimensions and weight of the cargo on an HMI. Alternatively, a user may input generalized dimension and weight information about the cargo on an HMI. For example, if a user inputs that the cargo in the cargo space is small and light, a threshold pressure to secure the cargo will be determined for small and light cargo. The supply device will expand the bladder to the threshold pressure, which results in the bladder hugging the cargo as tightly as possible without puncturing the bladder and without deforming the cargo.

The bladder remains expanded until, in one arrangement, the apparatus actuates a solenoid valve located on the supply device. The apparatus may actuate the solenoid valve in response to the supply device receiving an electronic input from a human machine interface (HMI) or in response to a user engaging with an input device, such as a switch located directly on the supply device. The HMI may be a touchpad, such as a multimedia display within the vehicle, a button, a switch, a door handle, a gear shifter, or a tailgate handle. For example, the supply device may begin compressing the expanded bladder when a user pulls on the tailgate of the vehicle. Alternatively, a user may instruct the supply device to compress the bladder manually by flipping a switch on the supply device. In any case, when the supply device receives an electronic input from an HMI or from a switch located on the supply device, a solenoid valve actuates. When the solenoid valve actuates, the flow of air or water within the bladder reverses into the supply device, causing the bladder to compress.

The bladder may comprise distinct zones. For example, in one configuration, the cover may be a trifold tonneau cover. As such, the bladder is separated into zones, each zone correlating to one section of the trifold tonneau cover. Accordingly, a pressure sensor corresponds to each zone. The supply device expands each zone of the bladder separately to a threshold pressure for each zone. The threshold pressure may depend on the dimensions and weight of the cargo beneath the zone, which may be input by a user. As such, if the cargo in the cargo area is beneath the first zone of the bladder but not the second and third zones of the bladder, only the first zone of the bladder will expand to the threshold pressure of the zone to securely hug the cargo. Accordingly, the second and third zones of the bladder will remain compressed. As previously discussed, the first zone of the bladder remains expanded until a solenoid valve on the supply device is actuated by an electronic input from an HMI or by a user engaging with a switch on the supply device to reverse the flow of air or water then-present in the bladder back into the supply device. In this way, the apparatus improves the prevention of cargo movement in a vehicle by utilizing an inflatable bladder to secure cargo.

Referring to FIG. 1, an example of an apparatus 100 is illustrated. As described herein, the apparatus is generally a system within a vehicle used to secure cargo. The apparatus 100 includes various elements. It will be understood that in various embodiments it may not be necessary for the apparatus 100 to have all of the elements shown in FIG. 1. The apparatus 100 can have any combination of the various elements shown in FIG. 1. Further, the apparatus 100 can have additional elements to those shown in FIG. 1. In some arrangements, the apparatus 100 may be implemented without one or more of the elements shown in FIG. 1.

Some of the possible elements of the apparatus 100 are shown in FIG. 1 and will be described along with subsequent figures. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the apparatus 100 includes the elements shown in FIG. 1 implemented to perform methods and other functions as disclosed herein relating to improving the prevention of cargo movement in a vehicle.

In one configuration, the apparatus 100 is associated with a cargo area 110. As used herein, a "cargo area" is a space in a vehicle where cargo may be placed, such as a trunk space, a space behind a seat of a vehicle, or the like. In one or more implementations, the cargo area 110 is a truck bed. While arrangements will be described herein with respect to truck beds, it will be understood that embodiments are not limited to truck beds.

In one approach, the apparatus 100 includes a cover 120 that extends over the cargo area 110. The cover 120 may be a rigid surface located within a vehicle. For example, the cover may be a roof, a tray, a seat back, or the like. In one or more embodiments, the cover 120 is a tonneau cover. As used herein, a tonneau cover is a cover that spans over a truck bed of a pickup truck.

In one embodiment, the apparatus 100 includes a bladder 150 coupled to the underside of the cover 120. The bladder 150 may be coupled to the underside of the cover 120 using an adhesive, straps, hooks, connectors, hook and loop fasteners, or the like by integrating the bladder 150 directly into the cover 120 during manufacturing, or the like. That is, in one arrangement, an underside of the cover may serve as a backside of the bladder itself. In any case, when the bladder 150 is coupled to the cover 120 and is in a retracted position, the bladder 150 lies substantially flat against the cover 120 and 150 faces the cargo area 110. The bladder 150 is, for example, made of a puncture-resistant material, such as rubber. Accordingly, in one arrangement, the bladder 150 touches rigid surfaces in the cargo area 110 when a supply device inflates the bladder 150 without puncturing.

In one configuration, the apparatus 100 includes a supply device 140 connected to the bladder 150 via a connecting member 160. The supply device 140 may be a device capable of expanding the bladder 150, such as a compressor, a fill valve, a pump, or the like. The supply device 140 may be located in or external to the vehicle. As such, the location of the supply device 140 is, for example, an inner deck panel of a truck bed, a trunk space, beneath a seat of a vehicle, or any space internal or external to a vehicle that allows the supply device 140 to connect to the bladder 150 with the connecting member 160.

The supply device 140 fills the bladder 150 with a supply capable of expanding the bladder 150, such as water, pre-bottled condensed air, or compressed air depending on the type of supply device 140 implemented in the apparatus 100. For example, if the supply device 140 is a compressor, the supply may be pre-bottled condensed air or compressed air. In one embodiment, if the supply device 140 is a fill valve, the supply may be water. In one configuration, if the supply device 140 is a pump, the pump may supply water or air to the bladder 150. The connecting member 160 may be any device that allows air or water to flow within it. For example, the connecting member 160 may be a pipe, a channel, a tube, or the like.

In one embodiment, the supply device 140 expands the bladder 150 into contact with cargo 130 present in the cargo area 110. The supply device 140 expands the bladder 150 when a solenoid valve 180 located on the supply device 140 actuates to a first position. The cargo 130 may be one or more items of any shape, size, and weight that fit in the cargo area 110. In one approach, the supply device 140 includes a pressure sensor 170 that senses the pressure within the bladder 150. In one arrangement, the supply device 140 fills the bladder 150 to a threshold pressure. The supply device 140 stops expanding the bladder 150 when the pressure sensor 170 informs the supply device 140 that the bladder 150 has reached the threshold pressure.

The threshold pressure may be set by an input from a user. For example, in one embodiment, a user sets the threshold pressure by entering an input, such as by pressing a button, flipping a switch, or the like, located on the supply device 140 to stop the supply device 140 from expanding the bladder 150 further. Alternatively, in one approach, a user stops the supply device 140 from expanding the bladder 150 further by entering an input on a human machine interface (HMI), such as a touchpad, button, switch, or the like located within the vehicle.

In one approach, a user selects the threshold pressure with an electronic input on an HMI, such as a touchpad, button, switch, knob, or the like located within the vehicle. For example, the user may enter an electronic input on a touchpad, such as a heads-up display, where the user sets the threshold pressure (e.g., 35 psi) for the supply device 140 to fill the bladder 150 to. Alternatively, a user may enter the threshold pressure on an input device located directly on the supply device 140. In one embodiment, the user selects the threshold pressure from a list of preset threshold pressures. For example, in one arrangement, the user has an option to fill the bladder 150 to a level one threshold pressure, a level two threshold pressure, a level three threshold pressure, etc., where each subsequent level corresponds to a higher threshold pressure for the supply device 140 to fill the bladder 150 to.

In one embodiment, the threshold pressure is based, at least in part, on the dimensions and weight of the cargo 130. For example, in one approach, a user inputs the approximate dimensions and weight of the cargo 130 present in the cargo area 110 on an HMI located within the vehicle or directly on the supply device 140. Accordingly, in one embodiment, a user may input details about the cargo 130, such as the dimensions of the cargo 130, the weight of the cargo 130, and the like on a touchpad located within the vehicle. In one approach, a user inputs the exact dimensions of the cargo 130 on an HMI (e.g., 2 feet wide by 2 feet tall by 2 feet long). Alternatively, in one arrangement, a user inputs generalized dimensions of the cargo 130 on an HMI (e.g., small, medium, large, etc.). In one embodiment, a user inputs the exact weight of the cargo 130 on an HMI (e.g., 20 pounds). Alternatively, in one configuration, a user inputs generalized weight information about the cargo 130 on an HMI (e.g., heavy, light, etc.). In one approach, the threshold pressure increases as the dimensions of the cargo decreases. As such, if a user inputs that the cargo 130 in the cargo area 110 is small, the threshold pressure will be high and causes the supply device 140 to expand the bladder 150 more than if the cargo 130 is large because lighter cargo 130 requires higher threshold pressures to remain stationary. In one embodiment, the threshold pressure increases as the weight of the cargo increases. Accordingly, if a user inputs that the cargo 130 in the cargo area 110 is heavy, the threshold pressure will be high and causes the supply device 140 to expand the bladder 150 more than if the cargo 130 is light because heavier cargo 130 can withstand higher pressures without deforming.

In response to the user inputting details about the cargo 130, the supply device 140 fills the bladder 150 to an appropriate threshold pressure. As such, if a user inputs that the cargo 130 present in the cargo area 110 is small and light, as shown in FIG. 1, the supply device 140 will fill the bladder 150 to a threshold pressure appropriate to tightly hold the cargo 130. For example, an input indicating that the cargo 130 is small informs the supply device 140 to expand the bladder 150 to a high threshold pressure so that the bladder 150 contacts and secures the cargo 130. An input indicating that the cargo 130 is light informs the supply device 140 that a high threshold pressure associated with small cargo is inappropriate to secure the cargo 130 and causes the threshold pressure to lower as to not damage the cargo 130. When the bladder 150 reaches the threshold pressure, the solenoid valve 180 actuates to a neutral position, which prevents the supply (i.e., air or water) from entering or leaving the bladder 150. The solenoid valve 180, in one embodiment, automatically moves to the neutral position upon the bladder 150 filling to the threshold pressure.

The bladder 150 remains expanded until the solenoid valve 180 actuates to a second position to reverse the flow of the supply (i.e., air or water) back into the supply device 140. In one arrangement, the bladder 150 includes one or more flexible joints within the bladder 150 that extend between a top and bottom surface of the bladder 150. When the flow of the supply reverses back into the supply device 140, the one or more flexible joints retracts to bring the bladder 150 to a flat, compressed position. The solenoid valve 180 actuates in response to, for example, an input on the supply device 140, such as a switch, button, or the like, or an electronic input from an HMI located on or within the vehicle, such as a touchpad, a button, a switch, a knob, a door handle, a tailgate handle, a gear shifter, or the like. For example, a user may actuate the solenoid valve 180 by flipping a switch located on the supply device 140 to a position corresponding to the reversal of supply flow. Alternatively, a user may actuate the solenoid valve 180 by inputting a command on a touchpad, such as a heads-up display, opening a tailgate by pulling on a tailgate handle, parking the vehicle, etc. In any case, upon receiving an input, the solenoid valve 180 actuates to a position to compress the bladder 150 by reversing the flow of supply.

Figure 2:
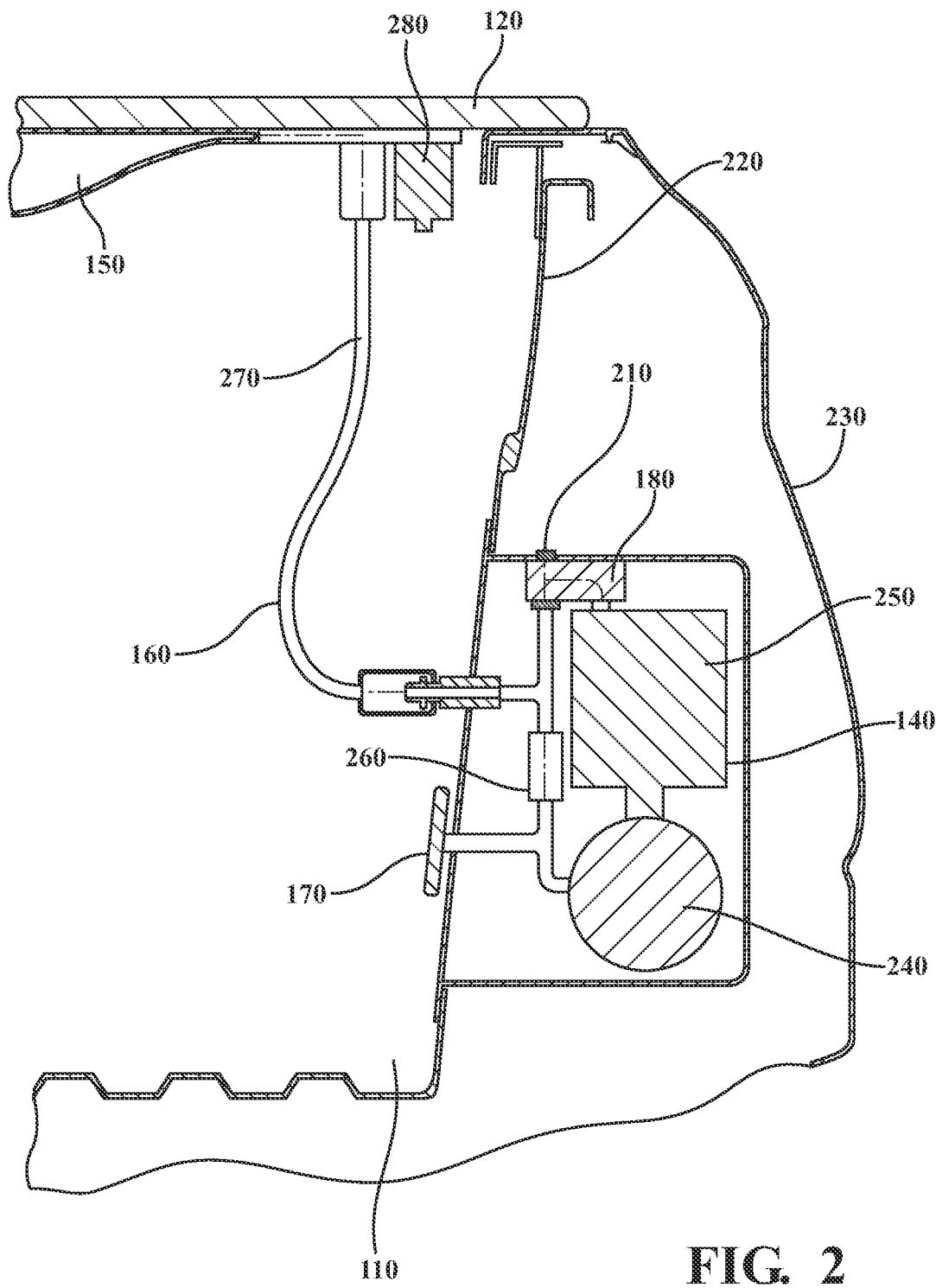
FIG. 2 illustrates one embodiment of the apparatus of FIG. 1 that is associated with improving the prevention of cargo movement in a cargo area by using a bladder that is expanded with a compressor.

With reference to FIG. 2, one embodiment of the apparatus 100 of FIG. 1 is further illustrated. As shown, the apparatus 100 is associated with the cargo area 110, which as illustrated in FIG. 2, is a truck bed. In one embodiment, the apparatus 100 further includes the cover 120, which as illustrated in FIG. 2, is a tonneau cover. In one configuration, the apparatus 100 includes the bladder 150. In one embodiment, the apparatus 100 includes the supply device 140 connected to the bladder 150 via connecting member 160.

As illustrated in FIG. 2, the supply device 140 is a compressor, which is comprised of compressor tank 240, compressor motor 250, pressure valve 260, the pressure sensor 170, and the solenoid valve 180. In one embodiment, the compressor tank 240 houses air, and the compressor motor 250 functions to compress the air so that it can leave the supply device 140 and fill the bladder 150. In one configuration, the pressure sensor 170 senses the pressure within the bladder 150. The pressure valve 260 prevents the pressure within the supply device 140 from getting too high. For example, if the pressure within the supply device 140 reaches a level that may lead to a malfunction of the supply device 140, such as an explosion, the pressure valve 260 actuates to release air from the compressor tank 240 to the exterior of the vehicle. As previously discussed, the pressure sensor 170 senses the pressure within the bladder 150. In one configuration, the solenoid valve 180 actuates to allow air to flow into the bladder 150 via air inlet 210 or out of the bladder 150.

In one embodiment, as illustrated in FIG. 2, the supply device 140 is located between a deck inner panel 220 and a deck side outer panel 230 of the cargo area 110. As such, the supply device 140 does not take up space in the cargo area 110, allowing more space for cargo, and the extra space normally present between the deck inner panel 220 and the deck side outer panel 230 are utilized.

In one approach, the supply device 140 sends compressed air supply 270 to the bladder 150 via the connecting member 160. In one embodiment, the connecting member 160 may include an air release valve 280 at the end of the connecting member 160 that is closest to the bladder 150. Accordingly, the air release valve 280 releases trapped air in the connecting member 160 to prevent malfunctions and flow blockages to the bladder 150 when appropriate.

Figure 3:
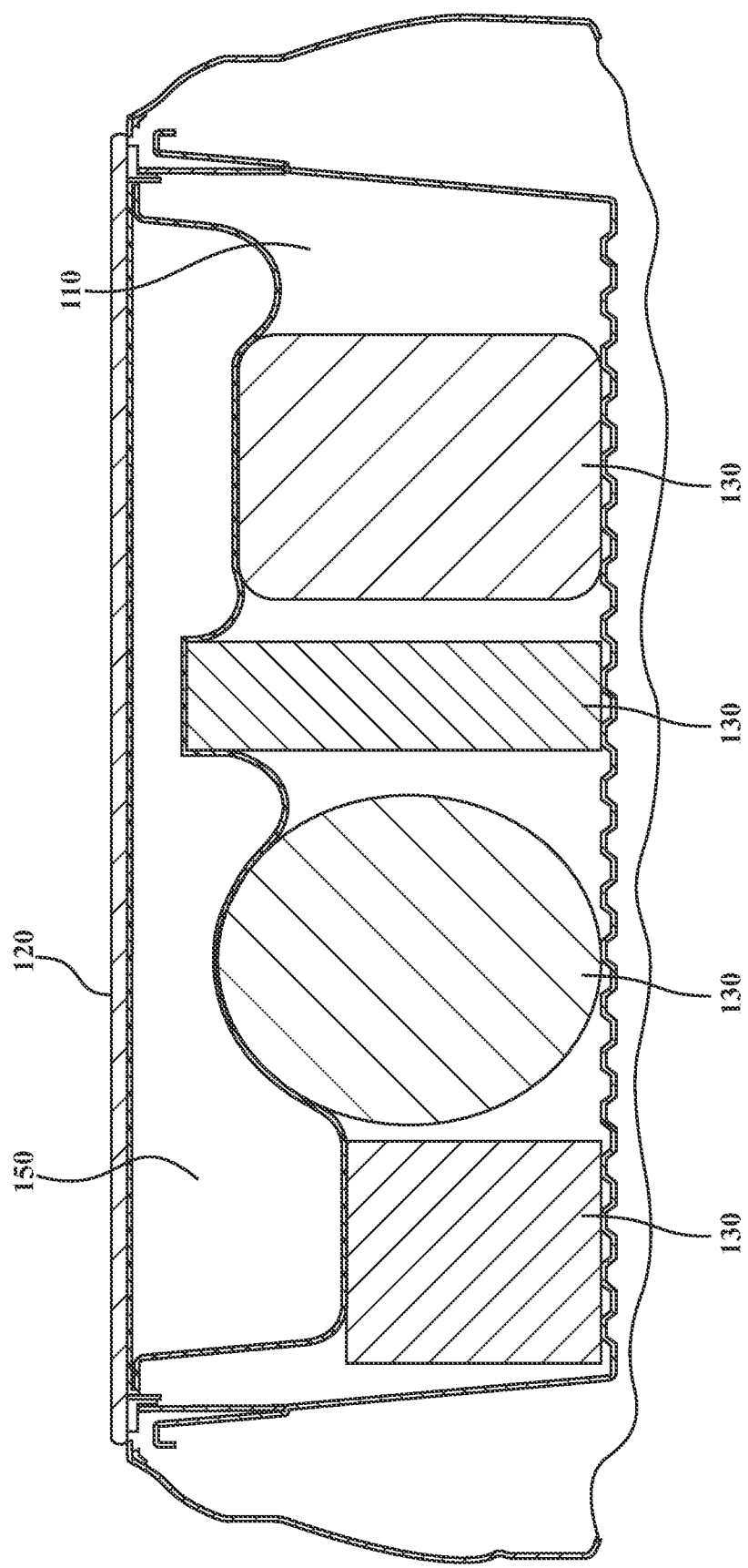
FIG. 3 illustrates one embodiment of an interior view of a cargo area implemented with the apparatus of FIG. 1.

With reference to FIG. 3, one embodiment of the cargo area 110 implemented with the apparatus 100 of FIG. 1 is illustrated. In one configuration, the cargo area 110 includes the cover 120 with the bladder 150 located on the underside of the cover 120. As illustrated in FIG. 3, in one or more embodiments, the bladder 150 expands to hold cargo 130 tightly to the floor of the cargo area 110. In one approach, the bladder 150 does not expand uniformly over the cargo 130. For example, the bladder 150 expands further to hold the shorter cargo 130 down, while the bladder 150 does not expand as far to hold the taller cargo 130 down. In any case, the bladder 150 may expand non-uniformly to hold down the cargo 130 present in the cargo area 110.

Figure 4:
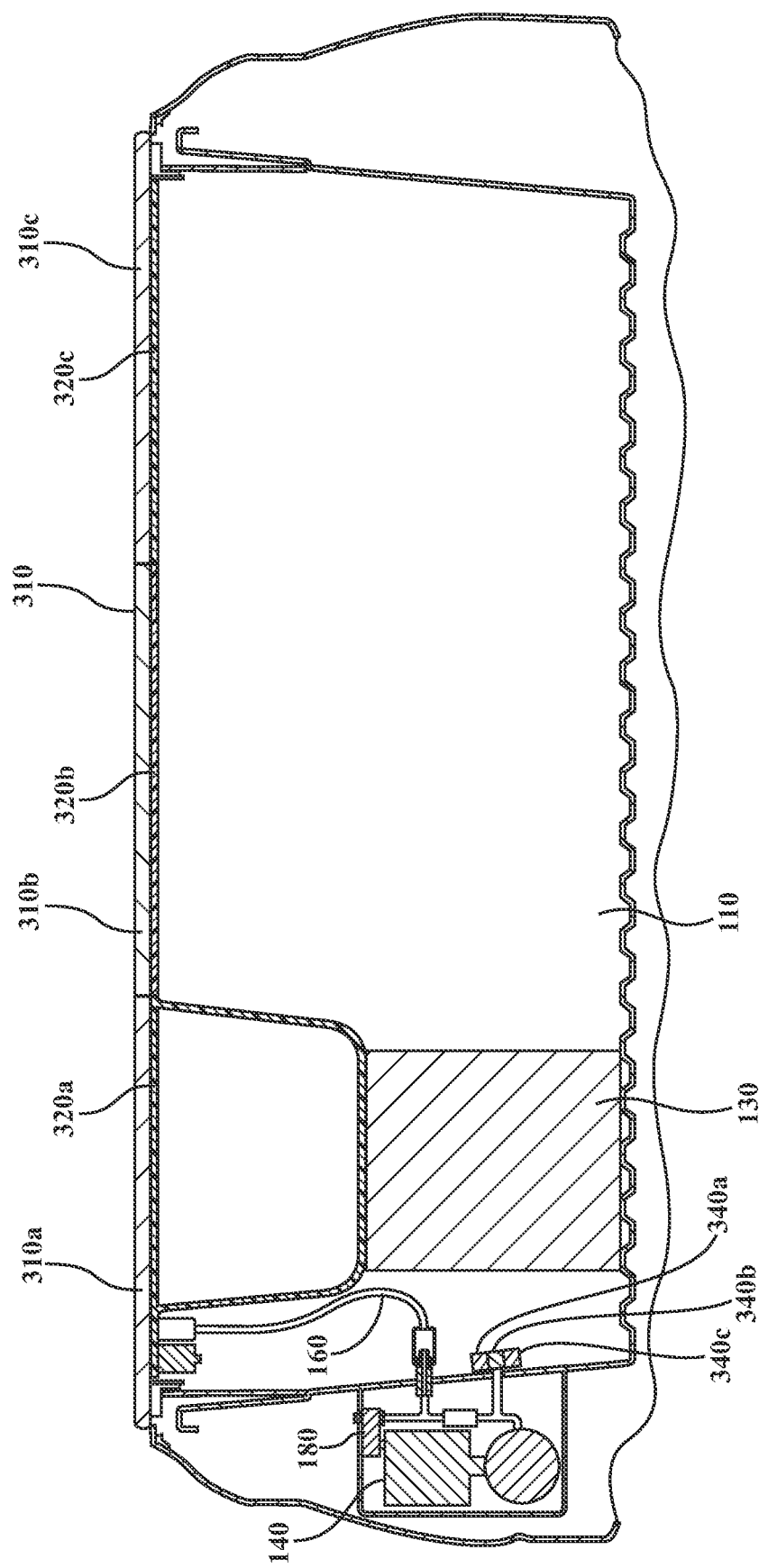
FIG. 4 illustrates one embodiment of the apparatus of FIG. 1 implemented with a trifold tonneau cover.

With reference to FIG. 4, one embodiment of the apparatus 100 of FIG. 1 is illustrated. FIG. 4 is cross-sectional view of the cargo area 110. In one configuration, the apparatus 100 includes a cover, where the cover is trifold tonneau cover 310. The trifold tonneau cover 310 comprises three different zones (i.e., trifold tonneau cover zone 310(a), trifold tonneau cover zone 310(b), and trifold tonneau cover zone 310(c)). In one embodiment, the apparatus 100 includes a bladder coupled to the underside of the trifold tonneau cover 310, where the bladder comprises bladder zone 320(a), bladder zone 320(b), and bladder zone 320(c) that correlate to each section of the trifold tonneau cover 310. In one configuration, bladder zone 320(a), bladder zone 320(b), and bladder zone 320(c) are separate bladders. In one approach, the apparatus 100 includes a supply device 140 that expands each of the bladder zone 320(a), the bladder zone 320(b), and the bladder zone 320(c) separately to contact and secure the cargo 130 extending to different distances from the cover 120 to hold the cargo 130 in place. The supply device 140 may send a supply, such as air or water, to each of the bladder zone 320(a), the bladder zone 320(b), and the bladder zone 320(c) via the connecting member 160.

In one configuration, the supply device 140 includes separate pressure sensors that sense the pressure within each zone of the bladder. For example, pressure sensor 340(a) senses the pressure within the bladder zone 320(a), pressure sensor 340(b) senses the pressure within the bladder zone 320(b), and pressure sensor 340(c) senses the pressure within the bladder zone 320(c). The supply device 140 stops the zones from expanding when the zones expand to a threshold pressure for the zones. As previously discussed, the threshold pressure for each zone may be set by a user using an electronic input from an HMI or by inputting the threshold pressure for each zone directly on the supply device 140. In one embodiment, the threshold pressure for each zone may depend, at least in part, on the dimensions and weight of the cargo 130 located underneath each zone.

Accordingly, in one or more arrangements, at least one bladder zone may not expand if cargo is not present beneath a particular zone. For example, as illustrated in FIG. 4, if the cargo 130 is only present underneath the bladder zone 320(a), only the bladder zone 320(a) will expand into contact with the cargo 130 as it is not necessary for other zones to expand in order to keep the cargo 130 secure. Alternatively, in one or more embodiments, if the cargo 130 is only present underneath the bladder zone 320(a), the bladder zones 320(b) and 320(c) may expand into contact with the floor of the cargo area 110 to provide extra security to the cargo 130. In any case, a user may input the threshold pressure for each bladder zone separately to control how each bladder zone expands.

While the embodiment of the apparatus 100 illustrated in FIG. 4 illustrates a cover and bladder with three separate zones, it should be understood that any number of bladder zones may be present in the apparatus 100, and as such, for every bladder zone, one pressure sensor will correspond to each bladder zone. Further, each bladder zone may expand to a threshold pressure for the zone which may depend, at least in part, on the dimensions and weight of the cargo beneath each bladder zone.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof

What is claimed is:

1. An apparatus for securing cargo within a vehicle, comprising:
    a bladder coupled to an underside of a cover that extends over a cargo area, the bladder facing the cargo area and comprising zones that are separately inflated to hold the cargo in place; and
    a supply device coupled with the bladder via a connecting member to expand the bladder into contact with the cargo within the cargo area,
    wherein the supply device expands the zones to separate threshold pressures that depend, at least in part, on attributes of the cargo associated with respective ones of the zones, wherein the attributes include at least dimensions and weight of the cargo that is acquired from inputs on an interface provided by a user.

2. The apparatus of claim 1, wherein the supply device is at least one of: a compressor, a fill valve, and a pump, and wherein a threshold pressure is increased as the weight of the cargo increases.

3. The apparatus of claim 1, wherein the cover is a tonneau cover.

4. The apparatus of claim 1, wherein a location of the cover includes at least one of: a truck bed, a trunk space, and a seatback.

5. The apparatus of claim 1, wherein the bladder is formed from a rubber material.

6. The apparatus of claim 1, wherein the supply device expands the bladder with at least one of: pre-bottled condensed air, compressed air, and water.

7. The apparatus of claim 1, wherein the supply device stops the bladder from expanding when the bladder expands to a threshold pressure, and
    wherein the threshold pressure depends, at least in part, on dimensions and weight of the cargo.

8. The apparatus of claim 1, wherein the supply device expands the zones separately to contact and secure the cargo extending to different distances from the cover to hold the cargo in place.

9. The apparatus of claim 8, wherein the zones correlate with sections of the cover, and wherein the cover is a tonneau cover.

10. The apparatus of claim 8, wherein the zones include separate pressure sensors,
    wherein the supply device stops the zones from expanding when the zones expand to a threshold pressure for the zones, and
    wherein the threshold pressure is increased as the dimensions of the cargo decrease.

* * * * *